United States Patent
Wilkison et al.

(10) Patent No.: US 12,544,396 B2
(45) Date of Patent: Feb. 10, 2026

(54) COMPOSITIONS AND METHODS FOR TREATING METABOLIC DISEASE

(71) Applicants: VOGENX, Durham, NC (US); KISSEI PHARMACEUTICAL CO., LTD., Azumino (JP)

(72) Inventors: Wiliam Owen Wilkison, Raleigh, NC (US); Bentley Cheatham, Durham, NC (US); James Trinca Green, Raleigh, NC (US); Yoshikazu Fujimori, Azumino (JP)

(73) Assignee: VOGENX, Durham, NC (US)

( * ) Notice: Subject to any disclaimer, the term of this patent is extended or adjusted under 35 U.S.C. 154(b) by 1057 days.

(21) Appl. No.: 17/614,055

(22) PCT Filed: Jun. 1, 2020

(86) PCT No.: PCT/US2020/000021
§ 371 (c)(1),
(2) Date: Nov. 24, 2021

(87) PCT Pub. No.: WO2020/242537
PCT Pub. Date: Dec. 3, 2020

(65) Prior Publication Data
US 2022/0257624 A1 Aug. 18, 2022

Related U.S. Application Data

(60) Provisional application No. 62/855,431, filed on May 31, 2019.

(51) Int. Cl.
| A61K 31/706 | (2006.01) |
| A61K 31/7012 | (2006.01) |
| A61K 31/7056 | (2006.01) |
| A61P 3/10 | (2006.01) |
| A61K 9/00 | (2006.01) |

(52) U.S. Cl.
CPC ........ *A61K 31/706* (2013.01); *A61K 31/7012* (2013.01); *A61K 31/7056* (2013.01); *A61P 3/10* (2018.01); *A61K 9/0053* (2013.01)

(58) Field of Classification Search
None
See application file for complete search history.

(56) References Cited

U.S. PATENT DOCUMENTS

| 7,655,679 B2 | 2/2010 | Keil et al. |
| 8,324,176 B2 | 12/2012 | Fushimi et al. |
| 8,951,976 B2 | 2/2015 | Katsuno et al. |
| 9,758,520 B2 | 9/2017 | Schwink et al. |
| 9,896,434 B2 | 2/2018 | Schwink et al. |
| 2010/0261644 A1 | 10/2010 | Defossa et al. |
| 2013/0096076 A1 | 4/2013 | Dugi et al. |

FOREIGN PATENT DOCUMENTS

| CN | 101277953 A | 10/2008 |
| CN | 106164073 A | 11/2016 |
| JP | 2017128545 A | 7/2017 |
| WO | 2014056938 A1 | 4/2014 |

OTHER PUBLICATIONS

Inoue et al. European Journal of Pharmacology (2017), vol. 806, pp. 25-31.*
Goodwin et al. Journal of Medicinal Chemistry (2017), vol. 60, pp. 710-721.*
Kapur, Anita, et al. "First human dose-escalation study with remogliflozin etabonate, a selective inhibitor of the sodium-glucose transporter 2 (SGLT2), in healthy subjects and in subjects with type 2 diabetes mellitus." BMC Pharmacology and Toxicology 14 (2013): 1-11.*
Danne et al., Diabetes Technology & Therapeutics United States, 2018, 20(S2);S269-S277.
Zambrowicz et al., Clinical Oharmacology & Therapeutics, 2012, 92(2);158-169.
Fujimori et al., The Journal of Pharmacology and Experimental Therapeutics, 2008, 327(1);268-276.
International Search Report and Written Opinion in International Application No. PCT/US20/00021, dated Jul. 28, 2020.
Dobbins et al., "Selective sodium-dependent glucose transporter 1 inhibitors blocl glucose absorption and impair glucose-dependent insulinotropic peptide release", Am. J. Physiol. Gastrointest. Liver Physiol. 308; G946-G954, 2015.
Mikhail, N. (2015). Remogliflozin etabonate: a novel SGLT2 inhibitor for treatment of diabetes mellitus. Expert Opinion on Investigational Drugs, 24(9), 1-7.

* cited by examiner

*Primary Examiner* — Patrick T Lewis
(74) *Attorney, Agent, or Firm* — RAPHAEL BELLUM PLLC

(57) ABSTRACT

The invention described herein relates to oral dosage form therapies for treating metabolic disorders using combinations of inhibitors of SGLT1 and SGLT2. In such dosage forms, SGLT1 is effective in the intestinal lumen, and is either not absorbed, or poorly absorbed, while the SGLT2 inhibitor inhibits sugar reabsorption in the kidney by inhibiting SGLT2 activity. Metabolic disorders treated by combined SGLT1 and SGLT2 oral dosage forms include disorders associated with abnormal accumulation of liver lipids, which may also be copresent with hyperglycemia. Combinations of SGLT1 and SGLT2 inhibitors are contemplated herein, particularly combinations.

9 Claims, 2 Drawing Sheets

COMPOSITIONS AND METHODS FOR TREATING METABOLIC DISEASE

FIELD OF THE INVENTION

The invention relates to compositions and methods for treating metabolic disease.

BACKGROUND

Persons with disorders in which lipids are abnormally accumulated in liver, such as non-alcoholic steatohepatitis (NASH), non-alcoholic fatty liver disease (NAFLD), hypernutritive fatty liver, diabetic fatty liver, alcoholic fatty liver, and toxic fatty liver as well as common fatty liver are increasing year by year. Above all, NASH is particularly acknowledged as a problem, because it exhibits serious symptoms. (Ishii et al., Tanaki et al). Moreover, abnormal lipid accumulation in the liver causes liver inflammation or fibril formation in liver (liver cirrhosis), which may then progress to more serious disorders such as liver cancer. (Ishii et al., Tanaki et al., Koike et al., Uchimura et al.) Therefore, inhibiting lipid accumulation in the liver is important for avoiding and treating liver diseases.

Therapeutic modalities for treating lipid accumulation in the liver are not uniform. (Kanzo) Presently, dietary therapy, exercise therapy, pharmacotherapy, and the like, are standard therapies for lipid accumulation in liver; however, these treatment modalities are difficult to control and implement, and thus, are not consistently successful. Meanwhile, in pharmacotherapy, polyene-phosphatidyl choline preparation is only listed under coverage.

In recent years, development of various antidiabetic agents has been progressing with the background of a rapid increase of patients with diabetes. For example, α-glucosidase inhibitors, which delay carbohydrate digestion and absorption at the small intestine, are used to improve postprandial hyperglycemia. It has been also reported that acarbose, an α-glucosidase inhibitors, prevents or delays the incidence of diabetes by applying to patients with impaired glucose tolerance. Uchimura et al. However, as α-glucosidase inhibitors do not affect elevated glucose levels associated with ingestion of glucose, and in view of changing compositions of sugars in meals, it has been desired to develop agents which exert a wider range of activities inhibiting carbohydrate absorption.

Subtypes of sodium-dependent glucose transporter (SGLT) include SGLT1, which is primarily expressed in the small intestine, and SGLT2, which is expressed in the renal proximal tubule. These are responsible for absorption of glucose in the small intestine and reabsorption of glucose in the proximal tubule.

U.S. Pat. No. 7,635,684, herein incorporated by reference in its entirety, describes compounds that show an inhibitory activity in human SGLT1 at the small intestine. U.S. Pat. No. 9,200,025, herein incorporated by reference in its entirety, describes potent inhibitors of SGLT1, including selective inhibitors for SGLT1, and inhibitors having low systemic exposure, and act locally in the gut. Insufficiency of glucose and galactose absorption arises in patients with dysfunction due to congenital abnormalities of human SGLT1. In addition, it has been confirmed that SGLT1 is involved in glucose and galactose absorption. Furthermore, it is confirmed that mRNA and protein of SGLT1 increase and absorption of glucoses are accelerated in OLETF rats and rats with streptozotocin-induced diabetic symptoms. Generally, in patients with diabetes, carbohydrate digestion and absorption are increased. For example, it is confirmed that mRNA and protein of SGLT1 are highly increased in the human small intestine.

Blocking human SGLT1 activity inhibits absorption of carbohydrates such as glucose at the small intestine, and subsequently can prevent increase of blood sugar level. Since increase of SGLT1 in the small intestine is thought to contribute to increased carbohydrate absorption, fast development of agents, which have a potent inhibitory activity in human SGLT1, has been desired for the prevention or treatment of diabetes. U.S. Pat. No. 8,324,176. Crystalline compounds of mizagliflozin have been described for use of prevention or treatment of a disease associated with hyperglycemia such as diabetes, impaired glucose tolerance, impaired fasting glycemia, diabetic complications or obesity, and a disease associated with the increase in blood galactose level such as galactosemia. U.S. Pat. No. 8,399,418 describes the monosebacate salt of mizagliflozin, and U.S. Pat. No. 8,354,382 describes the hemifumarate dehydrate salt of mizagliflozin. Mizagliflozin has also been described for the use of treatment of constipation. U.S. Pat. No. 9,694,027.

Mizagliflozin, 3-(3-{4-[3-(β-D-glucopyranosyloxy)-5-isopropyl-1H-pyrazol-4-ylmethyl-]-3-methylphenoxy}propylamino)-2,2-dimethylpropionamide, is a SGLT1 inhibitor created by Kissei Pharmaceutical Co., Ltd. No SGLT1 inhibitors have been approved to date. Mizagliflozin suppresses the uptake of glucose from the digestive tract by selectively inhibiting SGLT1. In addition, it acts primarily in the upper part of the small intestine and has a weak inhibitory effect on glucose absorption in the lower part of the small intestine since it is broken down and deactivated as it moves through the digestive tract. Gastrointestinal symptoms are not readily likely if the amount of glucose that remains without being absorbed is small.

Blocking a human SGLT1 activity inhibits absorption of carbohydrates such as glucose at the small intestine, subsequently preventing increase of blood sugar level. Especially, it is considered that delaying glucose absorption based on the above mentioned mechanism is effective to normalize postprandial hyperglycemia. In addition, since increase of SGLT1 in the small intestine is thought to contribute to increased carbohydrate absorption, fast development of agents, which have a potent inhibitory activity in human SGLT1, has been desired for the prevention or treatment of diabetes.

Recent clinical trial results that inhibition of SGLT1 can provide benefits that extend beyond those provided merely by the inhibition of glucose reabsorption. See, e.g., U.S. patent application publication no. US-2011-0218159. In particular, it is believed that inhibition of SGLT1 can increase glucagon-like peptide-1 (GLP-1) levels. See Moriya et al. A number of well-known diabetes drugs, including sitagliptin, vildagliptin and saxagliptin, work by inhibiting dipeptidyl peptidase IV (DPP-4), which is the enzyme responsible for GLP-1 degradation.

SGLT2 inhibitors are drugs with blood glucose-lowering action by inhibiting sugar reabsorption in kidney, and are useful as drugs for the prevention or treatment of diabetes mellitus. U.S. Pat. No. 8,951,976 discloses compositions and methods for the inhibition of progression of a disease associated with abnormal accumulation of liver lipids wherein the disease associated with abnormal accumulation of liver lipids, including NAFLD, NASH, hypernutritive fatty liver, alcoholic fatty liver disease, diabetic fatty liver and acute fatty liver of pregnancy, which comprises administering to a subject an effective amount of an SGLT2 inhibitor. U.S. Pat. No. 8,951,976, which is incorporated by reference in its entirety, discloses compositions and methods for the inhibition of progression of a disease associated with abnormal accumulation of liver lipids with SGLT2 inhibitors. SGLT2 inhibitors may also play a role in alleviating postprandial hypoglycemia. Hepprich et al. On the day of placebo administration, 1-3 h following the ingestion of the mixed meal, 7 of 12 patients developed severe symptomatic hypoglycemia requiring glucose administration. Id. All patients responded to 10 g glucose administration with immediate and complete resolution of their hypoglycemic symptoms, thus fulfilling the Whipple's triad. Id. In contrast, pre-treatment with empagliflozin (p=0.037), an SGLT2 inhibitor, significantly reduced the severity of hypoglycemic events with only two events requiring rescue glucose administration. Id. Moreover, nadir glucose values were significantly increased by this treatment. Id.

The following disclosure describes approaches to treating metabolic disorders, such as NAFLD and NASH, using therapies that combine the administration of SGLT1 inhibitors and SGLT2 inhibitors.

SUMMARY OF THE INVENTION

This invention generally relates to methods and compositions for treating metabolic disease. In particular, the invention relates to combinations and methods of use of a) a sodium/glucose co-transporter 2 (hereinafter referred to as SGLT2) inhibitor, and b) a sodium/glucose co-transporter 1 (hereinafter referred to as SGLT1) inhibitor which inhibits SGLT1 in the intestinal lumen, in treating metabolic diseases. For example, an oral dosage form administered to a subject in need thereof to treat a metabolic disorder, contains an SGLT2 inhibitor compound, and an SGLT1 inhibitor compound. More particularly, metabolic diseases treated by compositions and methods of the invention include disorders associated with abnormal accumulation of liver lipids and/or associated with hyperglycemia. In addition, due to the effect of SGLT1 and SGLT2 inhibitors on glucose absorption and excretion, compositions of the invention would affect hyperinsulinemia due to excess or abundant blood glucose.

Various combinations of SGLT1 and SGLT2 inhibitors are contemplated herein, particularly combinations in which the SGLT1 inhibitor SGLT1 in the intestinal lumen of the subject, and is either not absorbed, or poorly absorbed, systemically, while the SGLT2 inhibitor inhibits sugar reabsorption in the kidney by inhibiting SGLT2 activity.

DETAILED DESCRIPTION

Figure 1A:
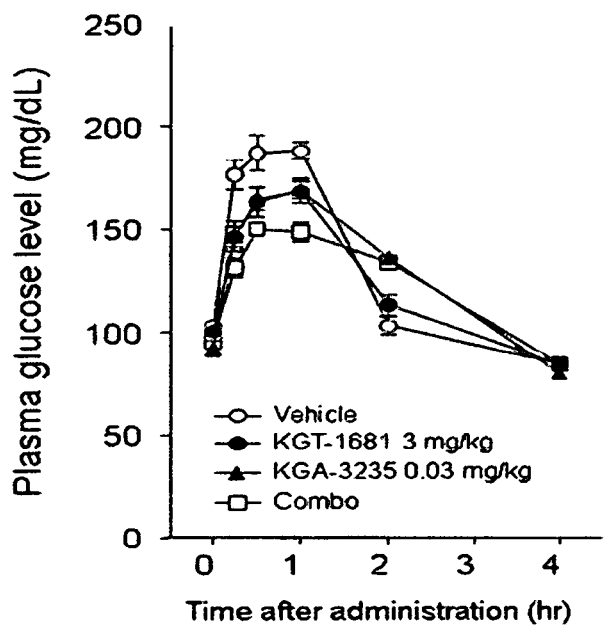
FIG. 1A is a graph showing the effects of Remogliflozin etabonate (referred to as KGT-1681), Mizagliflozin (referred to as KGA-3235) and the combination of Remogliflozin etabonate and Mizagliflozin (Combo) on plasma glucose (mg/dL) over a 4-hour post-administration period of time in an oral glucose tolerance test (OGTT) in normal rats.

The invention generally relates to methods and compositions for treating metabolic disease. Particularly, the invention relates to combinations of a) an SGLT2 inhibitor, and b) an SGLT1 inhibitor which inhibits SGLT1 in the intestinal lumen, and methods of use such combinations in treating metabolic diseases. In generally, a composition according to the invention is an oral dosage form The "SGLT2 inhibitor" in oral dosage forms of the invention inhibits sugar reabsorption in the kidney by inhibiting SGLT2 activity. SGLT2 inhibitors include, for example, the following SGLT2 inhibitor compounds, and pharmaceutically acceptable salts thereof: 2-(4-Methoxybenzyl)phenyl β-D-glucopyranoside; 2-(4-methylbenzyl) phenyl β-D-glucopyranoside; 2-(4-ethylbenzyl)phenyl-D-glucopyranoside; 2-(4-isobutylbenzyp-phenylβ-D-glucopyranoside; 2-(4-ethoxybenzyl)phenyl β-D-glucopyranosid; 2-(4-isopropoxybenzyl)phenyl β-D-glucopyranoside; 5-hydroxymethyl-2-(4-propoxybenzyl)-phenyl β-D-glucopyranoside; 2-(4-ethylbenzyl)-5-hydroxy-methylphenyl β-D-glucopyranoside; 2-[4-(2-hydroxyethyl)-benzyl]-5-hydroxymethylphenyl β-D-glucopyranoside; 2-[4-(2-hydroxyethyl)benzyl]phenyl β-D-glucopyranoside; 2-[4-(3-hydroxypropyl)benzyl]phenyl β-D-glucopyranoside; 2-(4-ethylthiobenzyl)phenyl β-D-glucopyranoside; 2-(4-methoxybenzyl)phenyl β-O-ethoxycarbonyl-β-D-glucopyranoside; 2-(4-methoxybenzyl)phenyl-6-O-methoxycarbonyl-β-D-glucopyranoside; 2-(4-methoxybenzyl)phenyl-6-O-[2-(methoxy)ethyloxycarbonyl]-β-D-glucopyranoside; 2-(4-methoxybenzyl)phenyl 6-O-hexanoyl-β-D-glucopyranoside; 2-(4-methoxybenzyl)phenyl 6-O-propionyl-β-D-glucopyranoside; 2-(4-methoxybenzyl) phenyl-6-O-butyryl-β-D-glucopyranoside; 2-(4-methoxybenzyl)phenyl 6-O-acetyl-β-D-glucopyranoside; 2-(4-methoxybenzyl)phenyl 6-O-isobutyryl β-D-glucopyranoside; 2-(4-methoxybenzyl)phenyl 6-O-ethylsuccinyl-β-D-glucopyranoside; 2-(4-methoxybenzyl)phenyl 6-O-isopropyloxy-carbonyl-β-D-glucopyranoside; 2-(4-methylbenzyl)phenyl-6-O-ethoxycarbonyl-β-D-glucopyranoside; 2-(4-methylbenzyl)-phenyl 6-O-methoxycarbonyl-β-D-glucopyranoside; 2-(4-ethylbenzyl)phenyl 6-O-ethoxycarbonyl-β-D-glucopyranoside; 2-(4-ethylbenzyl)phenyl 6-O-methoxycarbonyl-β-D-glucopyranoside; 5-amino-2-(4-ethylbenzyl)phenyl β-D-glucopyranoside; 2-[4-(3-hydroxypropyl)benzyl]-3,5-dimethyl-phenylβ-D-glucopyranoside; 2-[4-(2-hydroxyethyl)benzyl]-3,5-dimethyiphenyl β-D-glucopyranoside; 2-(4-methoxybenzyl)-3,5-dimethylphenylβ-D-glucopyranoside; 2-(4-ethylbenzyl)-5-hydroxymethylphenyl 6-O-ethoxycarbonyl-β-D-glucopyranoside; 2-(4-ethylbenzyl)-5-pivaloyloxymethyiphenyl β-D-glucopyranoside; 2-(4-ethylbenzyl)-5-hydroxymethylphenyl-6-O-butyryl-β-D-glucopyranoside; 5-acetoxy-2-(4-ethylbenzyl) phenyl D-glucopyranoside; 2-(4-ethylbenzyl)-5-(ethoxycarbonyloxymethyl)phenyl β-D-glucopyranoside; 2-(4-ethylbenzyl)-5-hydroxymethylphenyl 6-O-hexanoyl-β-D-glucopyranoside; 2-(4-ethylbenzyl)-5-hydroxymethylphenyl 6-O-pivaloyl-β-D-glucopyranoside; 2-(4-ethylbenzyl)-5-hydroxymethylphenyl-O-isobutyloxycarbonyl-β-D-glucopyranoside; 2-(4-ethylbenzyl)-5-hydroxymethylphenyl-O-isopropyloxycarbonyl-β-D-glucopyranoside; 2-[4-(2-benzyloxyethyl)benzyl]phenyl 6-O-ethoxycarbonyl-β-D-glucopyranoside; 2-[4-(2-benzyloxyethyl)benzyl] phenyl 6-O-acetyl-β-D-glucopyranoside; 2-[4-(2-acetoxyethyl)benzyl]phenyl 6-O-acetyl-(β-D-glucopyranoside; 2-(4-pyrazole-1-ylbenzyl)-phenyl β-D-glucopyranoside; 2-[4-(4-hydroxypiperidin-1-yl)-benzyl]β-D-glucopyranoside; 3-(β-D-glucopyranosyloxy)-4-[(4-isopropoxyphenyl)methyl]-5-methyl-1H-pyrazole; 3-(β-D-glucopyranosyloxy)-5-methyl-4-[(4-propylphenyl)methyl]-1H-pyrazole; 3-(β-D-glucopyranosyloxy)-4-[(4-isobutylphenyl)-methyl]-5-methyl-1H-pyrazole; 3-(β-D-glucopyranosyloxy)-5-methyl-4-[(4-propoxyphenyl)methyl]-1H-pyrazole, 4-[(4-ethoxyphenyl)methyl]-3-(β-D-glucopyranosyloxy)-5-methyl-1H-pyrazole; 3-(β-D-glucopyranosyloxy)-5-methyl-4-[(4-methylthiophenyl)methyl]-1H-pyrazole; 5-ethyl-3-(β-D-glucopyranosyloxy)-4-[(4-methylthiophenyl)methyl]-1H-pyrazole; 3-(β-D-glucopyranosyloxy)-4-[(4-isopropylphenyl)methyl]-5-methyl-1H-pyrazole; 3-(β-D-glucopyranosyloxy)-4-[(4-methylthiophenyl)methyl]-5-trifluoromethyl-1H-pyrazole; 3-(β-D-glucopyranosyloxy)-4-[(4-methoxyphenyl)methyl]-5-trifluoromethyl-1H-pyrazole; 3-(β-D-glucopyranosyloxy)-4-[(4-methoxyphenyl)methyl]-5-methyl-1H-pyrazole; 3-(β-D-glucopyranosyloxy)-1-methyl-4-[(4-methylthiophenyl)methyl]-5-trifluoromethylpyrazole; 3-(β-D-glucopyranosyloxy)-5-methyl-4-[(4-methylphenyl)methyl]-1H-pyrazole; 4-[(4-ethylphenyl)methyl]-3-(β-D-glucopyranosyloxy)-5-methyl-1H-pyrazole; 4-[(4-ethylphenyl)methyl]-3-(β-D-glucopyranosyloxy)-5-trifluoromethyl-1H-pyrazole; -(β-D-glucopyranosyloxy)-4-[(4-methoxyphenyl)methyl]-1,5-dimethylpyrazole; 3-(β-D-glucopyranosyloxy)-1-methyl-4-[(4-methylthiophenyl)-methyl]-5-trifluoromethylpyrazole; 1-ethyl-3-(β-D-glucopyranosyloxy)-4-[(4-methylthiophenyl)methyl]-5-trifluoro-methylpyrazole; 3-(β-D-glucopyranosyloxy)-4-[(4-methyl-thiophenyl)methyl]-1-propyl-5-trifluoromethylpyrazole; 3-(β-D-glucopyranosyloxy)-4-[(4-isopropoxyphenyl)methyl]-5-methyl-1-propylpyrazole; 1-ethyl-3-(β-D-glucopyranosyloxy)-4-[(4-isopropoxyphenyl)methyl]-5-methylpyrazole; 1-ethyl-3-(β-D-glucopyranosyloxy)-4-[(4-methoxyphenyl)-methyl]-5-methylpyrazole; 3-(β-D-glucopyranosyloxy)-4-[(4-methoxyphenyl)methyl]-5-methyl-1-propylpyrazole; 1-ethyl-4-[(4-ethoxyphenyl)methyl]-3-(β-D-glucopyranosyloxy)-5-methyl-1-propylpyrazole; 1-ethyl-4-[(4-ethylphenyl)-methyl]-3-(β-D-glucopyranosyloxy)-5-methylpyrazole; 4-[(4-ethylphenyl)methyl]-3-(β-D-glucopyranosyloxy)-5-methyl-1-propylpyrazole; 3-(β-D-glucopyranosyloxy)-4-[(4-isopropylphenyl)methyl]-1-isopropyl-5-methylpyrazole; 3-(β-D-glucopyranosyloxy)-5-methyl-4-{[4-(cyclopropylidenemethyl)-phenyl]methyl}-1H-pyrazole; 3-(β-D-glucopyranosyloxy)-5-methyl-4-[(4-cyclopropylphenyl)methyl]-1H-pyrazole; (E)-4-{[4-(buta-1-en-1-yl)phenyl]methyl}-3-(β-D-glucopyranosyloxy)-5-methyl-1H-pyrazole; 3-(β-D-glucopyranosyloxy)-5-methyl-4-{[4-(thiazole-2-yl)phenyl]methyl}-1H-pyrazole; glucopyranosyloxy)-4-{[4-(3-hydroxypropyl)phenyl]-methyl}-5-trifluoromethyl-1H-pyrazole; 3-(β-D-glucopyranosyloxy)-5-methyl-4-{[4-(2-methylpropa-1-en-1-yl)-phenyl]methyl}-1H-pyrazole; 4-{[4-(4-fluorophenyl)phenyl]methyl}-3-(β-D-glucopyranosyloxy)-5-methyl-1H-pyrazole; 4-{[4-(cyclobutyloxy)phenyl]methyl}-3-(β-D-glucopyranosyloxy)-5-methyl-1H-pyrazole; 3-(β-D-glucopyranosyloxy)-5-methyl-1-(cyclopropylmethyl)-4-[(4-cyclopropylphenyl)-methyl]-1H-pyrazole; 1-(cyclopropylmethyl)-3-(β-D-glucopyranosyloxy)-5-methyl-4-[(4-methylthiophenyl)methyl]-1H-pyrazole; 4-[(4-ethylphenyl)methyl]-3-(β-D-glucopyranosyloxy)-1-(3-hydroxypropyl)-5-methyl-1H-pyrazole; 2-(4-pyrazole-1-ylbenzyl) β-D-glucopyranoside; 2-[4-(4-hydroxypiperidin-1-yl)benzyl]phenyl β-D-glucopyranoside; 4-[(4-isopropoxyphenyl)methyl]-1-isopropyl-3-(6-O-methoxycarbonyl-β-D-glucopyranosyloxy)-5-methylpyrazole; 3-(6-O-ethoxycarbonyl-β-D-glucopyranosyloxy)-4-[(4-isopropoxyphenyl)-methyl]-1-isopropyl-5-methylpyrazole; 3-(6-O-isopropoxycarbonyl-(β-D-glucopyranosyloxy)-4-[(4-isopropoxyphenyl)-methyl]-1-isopropyl-5-methylpyrazole; 3-(6-O-isobutoxycarbonyl-(β-D-glucopyranosyloxy)-4-[(4-isopropoxyphenyl)-methyl]-1-isopropyl-5-methylpyrazole; 4-[(4-ethylphenyl)-methyl]-1-isopropyl-3-(6-O-methoxy-carbonyl-(β-D-glucopyranosyloxy)-5-methylpyrazole; 3-(6-O-ethoxycarbonyl-β-D-glucopyranosyloxy)-4-[(4-ethylphenyl)methyl]-1-isopropyl-5-methylpyrazole; 4-[(4-ethylphenyl)methyl]-3-(6-O-isopropoxycarbonyl-(β-D-glucopyranosyloxy)-1-isopropyl-5-methylpyrazole; 4-[(4-ethylphenyl)methyl]-3-(6-O-isobutoxycarbonyl(β-D-glucopyranosyloxy)-1-isopropyl-5-methyl-pyrazole; 4-[(4-ethoxyphenyl)methyl]-1-isopropyl-3-(6-methoxycarbonyl-β-D-glucopyranosyloxy)-5-methylpyrazole; 3-(6-O-ethoxycarbonyl-β-D-glucopyranosyloxy)-4-[(4-ethoxyphenyl)methyl-1-isopropyl-5-methylpyrazole; 4-[(4-ethoxyphenyl)methyl]-3-(6-O-isopropoxycarbonyl-(β-D-glucopyranosyloxy)-1-isopropyl-5-methylpyrazole; 3-(6-O-ethoxycarbonyl-β-D-glucopyranosyloxy)-1-isopropyl-4-[(4-methoxyphenyl)methyl]-5-methylpyrazole; 4-(4-ethoxyphenyl)-methyl]-3-(6-O-isobutoxycarbonyl-β-D-glucopyranosyloxy)-1-isopropyl-5-methylpyrazole; 1-isopropyl-3-(6-0-methoxycarbonyl-8-D-glucopyranosyloxy)-4-[(4-methoxyphenyl)-methyl]-5-methylpyrazole; 3-(6-O-isopropoxycarbonyl-(β-D-glucopyranosyloxy)-1-isopropyl-4-[(4-methoxyphenyl)-methyl]-5-methylpyrazole; 3-(6-O-isobutoxycarbonyl-β-D-glucopyranosyloxy)-1-isopropyl-4-[(4-methoxyphenyl)-methyl]-5-methylpyrazole; 2-[(4-ethoxyphenyl)methyl]-4-(β-D-glucopyranosyl)-1-chlorobenzene; 1-isopropyl-3-(6-O-methoxycarbonyl-β-D-glucopyranosyloxy)-5-methyl-4-[(4-methylthiophenyl)methyl]pyrazole; ethoxycarbonyl-O-D-glucopyranosyloxy)-1-isopropyl-5-methyl-4-[(4-methylthiophenyl)methyl]pyrazole; 3-(6-O-isopropoxycarbonyl-β-D-glucopyranosyloxy)-1-isopropyl-5-methyl-4-[(4-methyl-thiophenyl)methyl]pyrazole; 3-(6-O-isobutoxycarbonyl-β-D-glucopyranosyloxy)-1-isopropyl-5-methyl-4-[(4-methyl-thiophenyl)methyl]pyrazole; 3-(4-ethylbenzyl)-2-(β-D-glucopyranosyloxy)-4,6-dimethylpyridine; 2-(β-D-glucopyranosyloxy)-3-(4-methoxybenzyl)-4,6-dimethylpyridine; 2-(β-D-glucopyranosyloxy)-3-{4-(2-hydroxyethyl)benzyl}-4,6-dimethylpyridine; and 2-(β-D-glucopyranosyloxy)-6-methoxy-3-(4-methoxybenzyl)-4-methylpyridine.

"Pharmaceutically acceptable salts" refers to salts prepared from pharmaceutically acceptable non-toxic acids or bases including inorganic acids and bases and organic acids and bases. Suitable pharmaceutically acceptable base addition salts include, but are not limited to, metallic salts made from aluminum, calcium, lithium, magnesium, potassium, sodium and zinc or organic salts made from lysine, N,N'-dibenzylethylenediamine, chloroprocaine, choline, diethanolamine, ethylenediamine, meglumine (N-methylglucamine) and procaine. Suitable non-toxic acids include, but are not limited to, inorganic and organic acids such as acetic, alginic, anthranilic, benzenesulfonic, benzoic, camphorsulfonic, citric, ethenesulfonic, formic, fumaric, furoic, galacturonic, gluconic, glucuronic, glutamic, glycolic, hydrobromic, hydrochloric, isethionic, lactic, maleic, malic, mandelic, methanesulfonic, mucic, nitric, pamoic, pantothenic, phenylacetic, phosphoric, propionic, salicylic, stearic, succinic, sulfanilic, sulfuric, tartaric acid, and p-toluenesulfonic acid. Specific non-toxic acids include hydrochloric, hydrobromic, phosphoric, sulfuric, and methanesulfonic acids. Examples of specific salts thus include hydrochloride and mesylate salts. Others are well-known in the art. See, e.g., Remington's Pharmaceutical Sciences, 18th ed. (Mack Publishing, Easton Pa.: 1990) and Remington: The Science and Practice of Pharmacy, 19th ed. (Mack Publishing, Easton Pa.: 1995).

Preferably, the SGLT2 inhibitor is remogliflozin or a pharmaceutical salt thereof. More preferably, the SGLT2 inhibitor is remogliflozin etabonate. Remogliflozin etabonate is the pro-drug of remogliflozin. Remogliflozin etabonate (5-methyl-4-[4-(1-methylethoxy)benzyl]-1-(1-methylethyl)-1H-pyrazol-3-yl 6-O-(ethoxycarbonyl)-β-D glucopyranoside), including its solvates with pharmaceutically acceptable solvents such as ethanol and water, is represented by the following formula: IUPAC: 4-[(4-isopropoxyphenyl)methyl]-1-isopropyl-5-methyl-1H-pyrazol-3-yl-6-O-(ethoxycarbonyl)-β-D-glucopyranoside (MW: 522.59 g/mol; Molecular Formula: C26H38N2O9; CAS: 442201-24-3).

An SGLT1 inhibitor in oral dosage forms of the invention includes SGLT1 inhibitor compounds, and pharmaceutically acceptable salts thereof, of Formula I or II, as described below.

In Formula I:

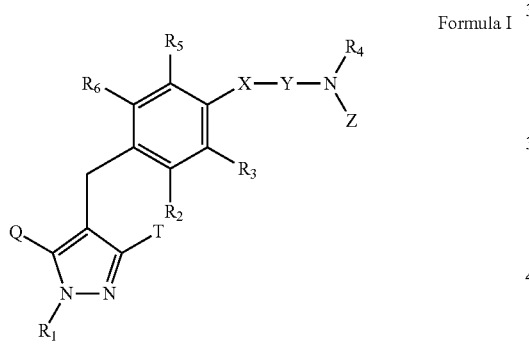

Formula I $R_1$ is H, or an optionally substituted $C_{1-6}$ alkyl group; one of Q or T is either

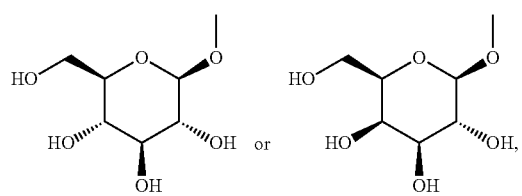

and one of Q or T is $C_{1-6}$ alkyl group, a halo($C_{1-6}$ alkyl) group, a $C_{1-6}$ alkoxy-substituted ($C_{1-6}$ alkyl) group or a $C_{3-7}$ cycloalkyl group;

$R_2$ is H, a halogen, a hydroxy group, a $C_{1-6}$ alkyl group, a $C_{1-6}$ alkoxy group, a $C_{1-6}$ alkylthio group, a halo($C_{1-6}$ alkyl) group, a halo($C_{1-6}$ alkoxy) group, a $C_{1-6}$ alkoxy-substituted ($C_{1-6}$ alkoxy) group, a $C_{3-7}$ cycloalkyl-substituted ($C_{2-6}$ alkoxy) group or -A-$R^A$ in which A represents a single bond, an oxygen atom, a methylene group, an ethylene group, —OCH$_2$— or —CH$_2$O—; and $R^A$ represents a $C_{3-7}$ cycloalkyl group, a $C_{2-6}$ heterocycloalkyl group, an aryl group which may have the same or different 1 to 3 substituents selected from the group consisting of a halogen atom, a hydroxy group, an amino group, a $C_{1-6}$ alkyl group, a $C_{1-6}$ alkoxy group, a $C_{2-7}$ alkenyloxy group, a halo($C_{1-6}$ alkyl) group, a hydroxy($C_{1-6}$ alkyl) group, a carboxy group, a $C_{2-2}$ alkoxycarbonyl group, a cyano group and a nitro group, or a heteroaryl group which may have a substituent selected from the group consisting of a halogen atom and a $C_{1-6}$ alkyl group;

X is a single bond, an oxygen atom or a sulfur atom;

Y is a $C_{1-6}$ alkylene group, optionally substituted by a hydroxy group or a $C_{2-6}$ alkenylene group;

Z represents —$R^8$, —COR$^C$, —SO$_2$R$^C$, —CON(R$^D$)R$^E$, —SO$_2$NHR$^F$ or —C(=NR$^G$)N(R$^H$)R$^I$; R$^C$ represents an aryl group which may have the same or different 1 to 3 substituents selected from the group consisting of a halogen atom, a hydroxy group, an amino group, a $C_{1-6}$ alkylsulfonylamino group, a $C_{1-6}$ alkyl group and a $C_{1-6}$ alkoxy group, a heteroaryl group which may have a substituent selected from the group consisting of a halogen atom, an amino group and a $C_{1-6}$ alkyl group, or a $C_{1-6}$ alkyl group which may have the same or different 1 to 5 groups selected from the following substituent group (i);

$R_4$, $R^8$, $R^D$, $R^E$ and $R^F$ are the same or different, and each represents a hydrogen atom, an aryl group which may have the same or different 1 to 3 substituents selected from the group consisting of a halogen atom, a hydroxy group, an amino group, a $C_{1-6}$ alkylsulfonylamino group, a $C_{1-6}$ alkyl group and a $C_{1-6}$ alkoxy group, a heteroaryl group which may have a substituent selected from the group consisting of a halogen atom, an amino group and a $C_{1-6}$ alkyl group, or a $C_{1-6}$ alkyl group which may have the same or different 1 to 5 groups selected from the following substituent group (i), or both of $R_4$ and $R^8$ bind together with the neighboring nitrogen atom to form a $C_{2-6}$ cyclic amino group which may have a substituent selected from the group consisting of a hydroxy group, a carbamoyl group, a $C_{1-6}$ alkyl group, an oxo group, a carbamoyl($C_{1-6}$ alkyl) group, a hydroxy($C_{1-6}$ alkyl) group and a $C_{1-6}$ alkylsulfonylamino-substituted ($C_{1-6}$ alkyl) group, or both of $R^D$ and $R^E$ bind together with the neighboring nitrogen atom to form a $C_{2-6}$ cyclic amino group which may have a substituent selected from the group consisting of a hydroxy group, a carbamoyl group, a $C_{1-6}$ alkyl group, an oxo group, a carbamoyl($C_{1-6}$ alkyl) group, a hydroxy($C_{1-6}$ alkyl) group and a $C_{1-6}$ alkylsulfonylamino-substituted ($C_{1-6}$ alkyl) group; R$^G$, R$^H$ and R$^I$ are the same or different, and each represents a hydrogen atom, a cyano group, a carbamoyl group, a $C_{2-7}$ acyl group, a $C_{2-7}$ alkoxycarbonyl group, an aryl ($C_{2-7}$ alkoxycarbonyl) group, a nitro group, a $C_{1-6}$ alkylsulfonyl group, a sulfamide group, a carbamimidoyl group, or a $C_{1-6}$ alkyl group which may have the same or different 1 to 5 groups selected from the following substituent group (i), or both of R$^G$ and R$^H$ bind to form an ethylene group, or both of R$^H$ and R$^I$ bind together with the neighboring nitrogen atom to form a $C_{2-6}$ cyclic amino group which may have a substituent selected from the group consisting of a hydroxy group, a carbamoyl group, a $C_{1-6}$ alkyl group, an oxo group, a carbamoyl($C_{1-6}$ alkyl) group, a hydroxy ($C_{1-6}$ alkyl) group and a $C_{1-6}$ alkylsulfonylamino-substituted ($C_{1-6}$ alkyl) group;

$R_3$, $R_5$ and $R_6$ are the same or different, and each represents a hydrogen atom, a halogen atom, a $C_{1-6}$ alkyl group or a $C_{1-6}$ alkoxy group; and substituent group (i) consists of a hydroxy group, a $C_{1-6}$ alkoxy group, a $C_{1-6}$ alkylthio group, an amino group, a mono or di($C_{1-6}$ alkyl)amino group, a mono or di[hydroxy($C_{1-6}$ alkyl)]amino group, an ureido group, a sulfamide group, a mono or di($C_{1-6}$ alkyl)ureido group, a mono or di($C_{1-6}$ alkyl)sulfamide group, a $C_{2-7}$ acylamino group, a $C_{1-6}$ alkylsulfonylamino group, a $C_{1-6}$ alkylsulfonyl group, a carboxy group, a $C_{2-7}$ alkoxycarbonyl group, —CON($R^J$)$R^K$ in which $R^J$ and $R^K$ are the same or different, and each represents a hydrogen atom or a $C_{1-6}$ alkyl group which may have the same or different 1 to 3 substituents selected from the group consisting of a hydroxy group, an amino group, a mono or di($C_{1-6}$ alkyl)amino group, a mono or di[hydroxy($C_{1-6}$ alkyl)]amino group, an ureido group, a mono or di($C_{1-6}$ alkyl)ureido group, a $C_{2-7}$ acylamino group, a $C_{1-6}$ alkylsulfonylamino group and a carbamoyl group, or both of $R^J$ and $R^K$ bind together with the neighboring nitrogen atom to form a $C_{2-6}$ cyclic amino group which may have a substituent selected from the group consisting of a hydroxy group, a carbamoyl group, a $C_{1-6}$ alkyl group, an oxo group, a carbamoyl($C_{1-6}$ alkyl) group, a hydroxy($C_{1-6}$ alkyl) group and a $C_{1-6}$ alkylsulfonylamino-substituted ($C_{1-6}$ alkyl) group, an aryl($C_{1-6}$ alkoxy) group which may have the same or different 1 to 3 substituents selected from the group consisting of a halogen atom, a hydroxy group, an amino group, a $C_{1-6}$ alkyl group and a $C_{1-6}$ alkoxy group on the ring, an aryl($C_{1-6}$ alkylthio) group which may have the same or different 1 to 3 substituents selected from the group consisting of a halogen atom, a hydroxy group, an amino group, a $C_{1-6}$ alkyl group and a $C_{1-6}$ alkoxy group on the ring, a $C_{3-7}$ cycloalkyl group, a $C_{2-6}$ heterocycloalkyl group, an aryl group which may have the same or different 1 to 3 substituents selected from the group consisting of a halogen atom, a hydroxy group, an amino group, a $C_{1-6}$ alkylsulfonylamino group, a $C_{1-6}$ alkyl group and a $C_{1-6}$ alkoxy group, a heteroaryl group which may have a substituent selected from the group consisting of a halogen atom, an amino group and a $C_{1-6}$ alkyl group, a $C_{2-6}$ cyclic amino group which may have a substituent selected from the group consisting of a hydroxy group, a carbamoyl group, a $C_{1-6}$ alkyl group, an oxo group, a carbamoyl($C_{1-6}$ alkyl) group, a hydroxy($C_{1-6}$ alkyl) group and a $C_{1-6}$ alkylsulfonylamino-substituted ($C_{1-6}$ alkyl) group, and a $C_{1-4}$ aromatic cyclic amino group which may have a $C_{1-6}$ alkyl group as a substituent.

In Formula II,

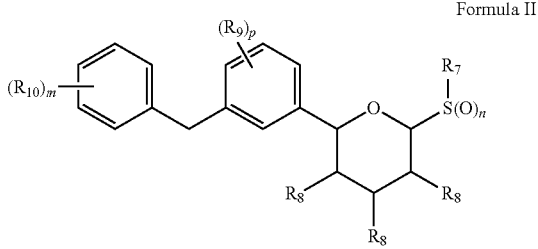

Formula II $R_7$ is hydrogen or optionally substituted $C_{1-10}$-alkyl, $C_{1-5}$-cycloalkyl, or 5-membered heterocycle, which optional substitution is with one or more $R_{7A}$; each $R_{7A}$ is independently amino, ester, amide, thiol, carboxylic acid, cyano, halo, hydroxyl, or optionally substituted $C_{1-4}$-alkoxy, $C_{1-5}$-cycloalkyl, or 5-membered heterocycle, which optional substitution is with one or more $R_{7B}$; each $R_{7B}$ is independently $C_{1-4}$-alkyl, halo, or hydroxyl; n is 0, 1, or 2;

each $R_8$ is independently F or $R_{8A}$, wherein each $R_{8A}$ is independently hydrogen, $C_{1-4}$-alkyl, or acyl;

each $R_9$ is independently halo, hydroxyl, or optionally substituted $C_{1-10}$-alkyl or $C_{1-10}$-alkoxy, which optional substitution is with one or more $R_{9A}$; each $R_{9A}$ is independently amino, ester, amide, thiol, carboxylic acid, cyano, halo, hydroxyl, or optionally substituted $C_{1-4}$-alkoxy, $C_{1-5}$-cycloalkyl, or 5-membered heterocycle, which optional substitution is with one or more $R_{9B}$; each $R_{9B}$ is independently $C_{1-4}$-alkyl, amino, cyano, halo, or hydroxyl;

p is 0, 1, or 2;

each $R_{10}$ is independently $R_{10A}$, —N($R_{10A}$)($R_{10B}$), —O$R_{10A}$, —S$R_{10A}$, —S(O)$R_{10A}$, or —S(O)2$R_{10A}$; $R_{10A}$ is optionally substituted $C_{4-20}$-alkyl or 4-20-membered heteroalkyl, which optional substitution is with one or more $R_{10C}$, and which is optionally attached to another $R_{10A}$ moiety to provide a dimer or trimer; $R_{10B}$ is hydrogen or $R_{10A}$; each $R_{10C}$ is independently amino, amido, azo, carbonyl, carboxyl, cyano, formyl, guanidino, halo, hydroxyl, imido, imino, isothiocyanate, nitrile, nitro, nitroso, nitroxy, oxo, sulfanyl, sulfinyl, sulfonyl, thial, thiocyanate, thione, thiourea, urea, or $X_1$, $X_1$-$L_1$-$X_2$, or $X_1$-$L_1$-$X_2$-$L_2$-$X_3$, wherein each of $X_1$, $X_2$ and $X_3$ is independently optionally substituted $C_{1-4}$-alkyl, $C_{1-6}$-cycloalkyl, 5- or 6-membered heterocycle, or aryl, which optional substitution is with one or more $R_{10D}$, and each of $L_1$ and $L_2$ is independently optionally substituted $C_{1-6}$-alkyl or 1-10-membered heteroalkyl, which optional substitution is with one or more of $R_{10E}$; each $R_{10D}$ is independently $R_{10E}$ or $C_{1-6}$-alkyl optionally substituted with one or more of $R_{10E}$; each $R_{10E}$ is independently amino, amido, azo, carbonyl, carboxyl, cyano, formyl, guanidino, halo, hydroxyl, imido, imino, isothiocyanate, nitrile, nitro, nitroso, nitroxy, oxo, sulfanyl, sulfinyl, sulfonyl, thial, thiocyanate, thione, or urea; and m is 1, 2 or 3;

In various embodiments of the invention, SGLT1 inhibitor compounds of Formula I and Formula II are selected from the group consisting of:

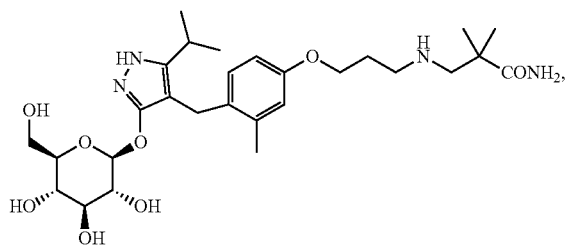

KGA-3235

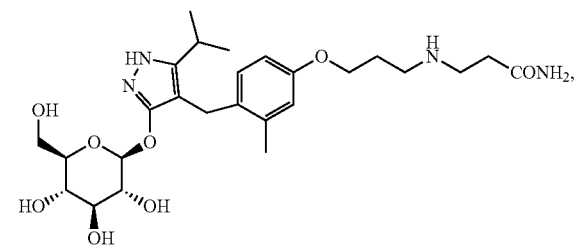

KGA-2727

Mizagliflozin

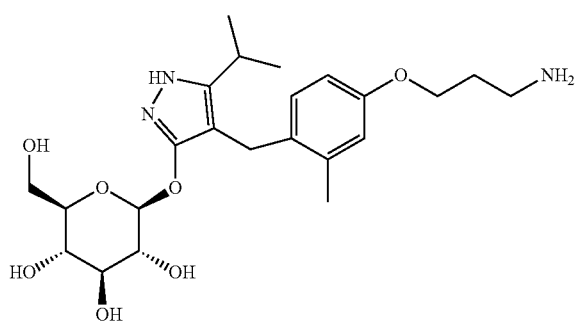

KGA-2586

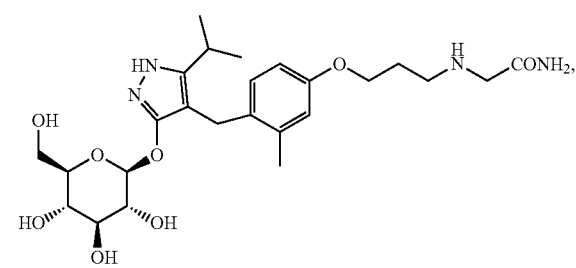

KGA-2588

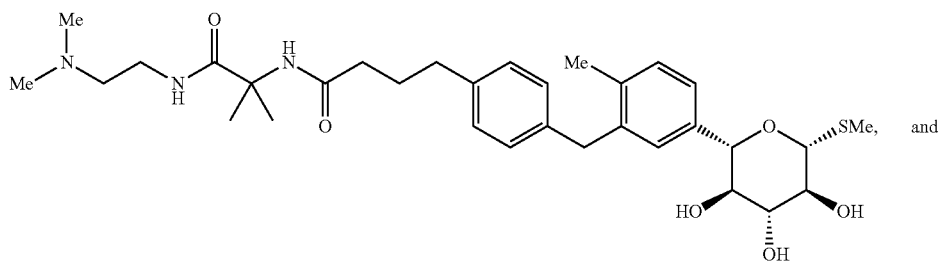

LX2761 and

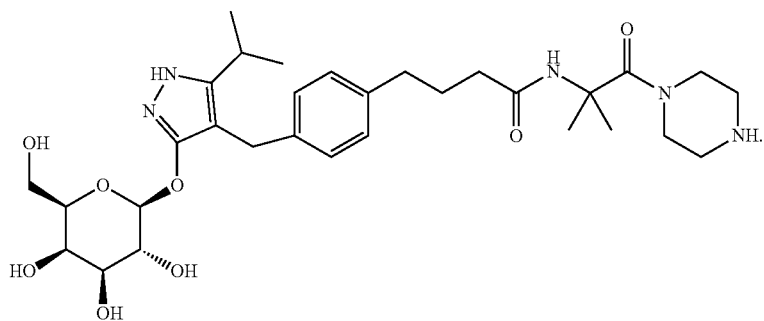

KGA-2891

Preferably, the SGLT1 inhibitor compound in a method of the invention is selected from LX2671 and mizagliflozin. More preferably, the SGLT1 inhibitor is mizagliflozin.

Mizagliflozin, 3-(3-{4-[3-(β-D-glucopyranosyloxy)-5-isopropyl-1H-pyrazol-4-ylmethyl-]-3-methylphenoxy}propylamino)-2,2-dimethylpropionamide, can be converted to a pharmaceutically acceptable salt according to methods known in the art. Examples of such salts include acid addition salts with mineral acids such as hydrochloric acid, hydrobromic acid, hydroiodic acid, sulfuric acid, nitric acid, phosphoric acid and the like, acid addition salts with organic acids such as formic acid, acetic acid, methanesulfonic acid, benzenesulfonic acid, p-toluenesulfonic acid, propionic acid, citric acid, succinic acid, tartaric acid, fumaric acid, butyric acid, oxalic acid, malonic acid, maleic acid, lactic acid, malic acid, carbonic acid, glutamic acid, aspartic acid and the like, salts with inorganic bases such as a sodium salt, a potassium salt and the like, and salts with organic bases such as N-methyl-D-glucamine, N,N'-dibenzyletylenediamine, 2-aminoethanol, tris (hydroxymethyl)aminomethane, arginine, lysine and the like. Preferably the mizagliflozin pharmaceutically acceptable salt is selected from mizagliflozin monosebacate and mizagliflozin hemifumarate dehydrate.

Mizagliflozin hemifumarate dihydrate is described in U.S. Pat. No. 8,354,382, which is incorporated in its entirety, is shown below.

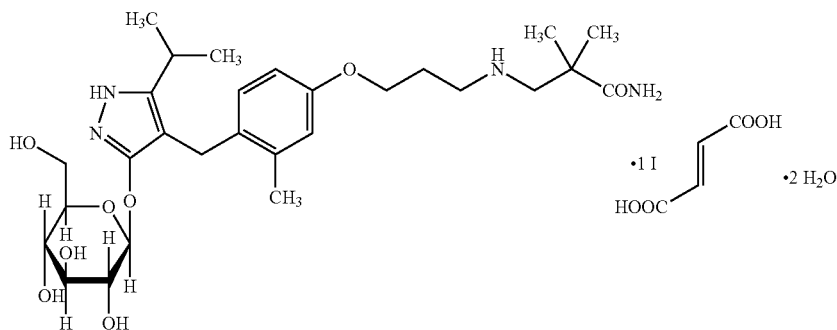

Mizagliflozin monosebacate is described in U.S. Pat. No. 8,399,418, which is incorporated in its entirety, is shown below.

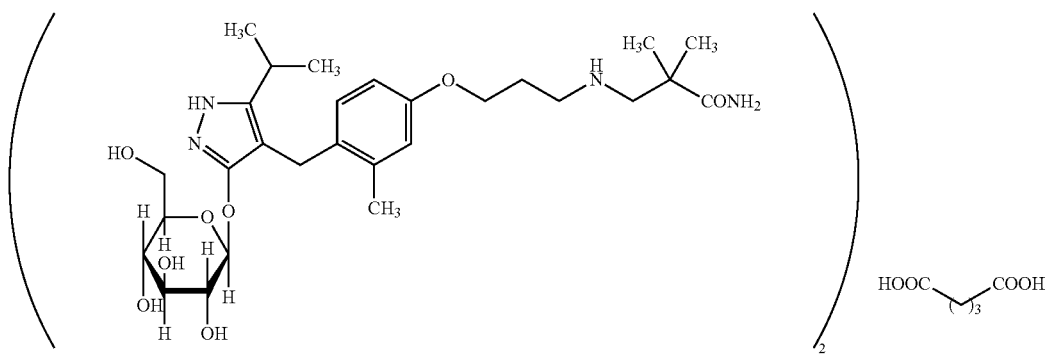

In oral dosage forms of the invention, the amount of SGLT2 inhibitor compound is from about 1.0 mg to 1000 mg; and the amount of the SGLT1 inhibitor compound is from about 0.25 mg to 20 mg. The amount of SGLT2 inhibitor compound in oral dosage forms of the invention is for example 1 mg, 2 mg, 5 mg, 10 mg, 20 mg, 50 mg, 100 mg, 150 mg, 200 mg, 250 mg, 300 mg, 350 mg, 400 mg, 450 mg, 500 mg, 550 mg, 600 mg, 650 mg, 700 mg, 750 mg, 800 mg, 850 mg, 900 mg, 950 mg, or 1000 mg. The amount of SGLT1 inhibitor compound in oral dosage forms of the invention is for example 0.25 mg, 0.3 mg, 0.35 mg. 0.4 mg, 0.5 mg, 1 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, or 20 mg. In oral dosage forms of the invention the wt/wt ratio of the SGLT2 inhibitor compound to the SGLT1 inhibitor compound is from 0.05:1 to 4000:1. The amounts of the SGLT2 or SGLT1 inhibitor compounds by weight in the oral dosage form, herein refer to the weight of the active ingredient i.e., inhibitor compound, not to the weight of the pharmaceutically acceptable salts thereof. In a preferred oral dosage form of the invention, the SGLT2 inhibitor is remogliflozin etabonate and the SGLT1 inhibitor is mizagliflozin sebacate.

Oral dosage forms are prepared, for example, by combining the active ingredient(s) in an intimate admixture with at least one excipient according to conventional pharmaceutical compounding techniques. Because of their ease of administration, tablets and capsules represent the most advantageous oral dosage unit forms. If desired, tablets can be coated by standard aqueous or nonaqueous techniques. Such dosage forms can be prepared by conventional methods of pharmacy. In general, pharmaceutical compositions and dosage forms are prepared by uniformly and intimately admixing the active ingredients with liquid carriers, finely divided solid carriers, or both, and then shaping the product into the desired presentation if necessary. Disintegrants may be incorporated in solid dosage forms to facility rapid dissolution. Lubricants may also be incorporated to facilitate the manufacture of dosage forms (e.g., tablets).

The invention also relates to a method of treatment of a metabolic disease comprising administering to a subject in need thereof an oral dosage form comprising: A) an SGLT2 inhibitor compound, or pharmaceutically acceptable salt thereof; and B) a SGLT1 inhibitor compound, which inhibits SGLT1 in the intestinal lumen of the subject, or pharmaceutically acceptable salt thereof.

In some methods of the invention, the metabolic disease is a disease associated with abnormal accumulation of liver lipids, and/or a disease associated with hyperglycemia. The term "disease associated with abnormal accumulation of liver lipids" means a disease wherein the lipids including triglyceride accumulate abnormally in liver, a disease wherein the ratio of the amount of lipids to healthy cells of the liver and the liver weight increase abnormally, and the size of the liver increases abnormally. A progressive type wherein the accumulative amount of lipids further increases is also included. Moreover, a disease that shifts to other diseases because of the accumulation of lipids, and a disease with inflammation are also included. Concretely besides common fatty liver, non-alcoholic fatty liver disease (NAFLD), non-alcoholic steatohepatitis (NASH), hypernutritive fatty liver, alcoholic fatty liver disease, toxic fatty livers diabetic fatty liver, acute fatty liver of pregnancy and the like can be illustrated.

The inhibitory effect on progression of the disease associated with abnormal accumulation of liver lipids can be confirmed by, for example, the examination that uses the KKAy mouse bearing the fatty liver. When 2-(4-methoxybenzyl)phenyl 6-O-ethoxycarbonyl-β-D-glucopyranoside of a SGLT2 inhibitor was orally administrated to rat, the symptom that the lipid accumulative amount in rat liver increases is inhibited significantly in comparison with the case where the present compound is not administered. (U.S. Pat. No. 8,915,976). The above-mentioned result proved that a pharmaceutical composition comprising as an active ingredient a SGLT2 inhibitor is extremely useful as an agent for the inhibition of progression of a disease associated with abnormal accumulation of liver lipids.

The term "disease associated with hyperglycemia" includes diseases such as diabetes, impaired glucose tolerance, impaired fasting glycemia, diabetic complications, obesity, hyperinsulinemia, hyperinsulinemic hypoglycemia, reactive hypoglycemia, hyperlipidemia, hypercholesterolemia, hypertriglyceridemia, lipid metabolism disorder, atherosclerosis, hypertension, congestive heart failure, edema, hyperuricemia and gout.

In some methods of the invention, the metabolic disease is diabetes mellitus, or metabolic syndrome, or dumping syndrome, or (post bariatric hypoglycemia) and/or non-alcoholic steatohepatitis and/or non-alcoholic fatty liver disease. Additional metabolic diseases in methods according to the invention include insulin resistance, primary biliary cholangitis, primary sclerosing cholangitis, gallbladder disease, dyslipidemia, high cholesterol, high levels of triglycerides, high blood pressure, hypertension, coronary artery disease, heart disease, stroke, thrombotic stroke, deep vein thrombosis (DVT), metabolic disorders, hypoalphalipoproteinemia, familial combined hyperlipidemia, Syndrome X, or insulin-resistant Syndrome X.

Unless otherwise indicated, a "therapeutically effective amount" of a compound is an amount sufficient to provide a therapeutic benefit in the treatment or management of a disease or condition, or to delay or minimize one or more symptoms associated with the disease or condition. A "therapeutically effective amount" of a compound means an amount of therapeutic agent, alone or in combination with other therapies, which provides a therapeutic benefit in the treatment or management of the disease or condition. The term "therapeutically effective amount" can encompass an amount that improves overall therapy, reduces, or avoids symptoms or causes of a disease or condition, or enhances the therapeutic efficacy of another therapeutic agent.

The terms "treat," "treating," and "treatment" contemplate an action that occurs while a patient is suffering from the specified disease or disorder, which reduces the severity of the disease or disorder, or retards or slows the progression of the disease or disorder.

EXAMPLES

Example 1. Combination treatment with mizagliflozin and remogliflozin. Combination treatment with KGT-1681 and KGA-3235 in normal rats. KGT-1681 was suspended in 0.1% methylcellulose (MC) and KGA-3235 was dissolved in distilled water (DW). Rats (9 weeks of age) were divided into the following four groups and treated as indicated: vehicle, 0.1% MC+DW; KGT, KGT-1681 (3 mg/kg, 5 mL/kg) plus DW; KGA, 0.1% MC plus KGA-3235 (0.03 mg/kg, 5 mL/kg); and Combo, KGT-1681 plus KGA-3235 (3 and 0.03 mg/kg, respectively). After 16 h fasting, the drug and glucose solution (400 g/L, 5 ml/kg) were orally administered to rats. Blood was obtained in heparinized and aprotinin-treated tubes from a tail vein at each sampling point. Plasma glucose concentration was determined using a Glucose CII-test Wako (Wako Pure Chemicals, Osaka, Japan). Plasma insulin was determined using an enzyme-linked immunosorbent assay kit (Morinaga Institute of Biological Science, Inc., Yokohama, Japan). The area under the curve (AUC)0-1 hr for plasma glucose and insulin were calculated from the plasma glucose and insulin concentrations during the OGTT (Table 1).

TABLE 1

|  | Vehicle | KGA-1681 3 mg/kg | KGA-3235 0.03 mg/kg | Combo |
|---|---|---|---|---|
| Plasma glucose (mg/dL) |  |  |  |  |
| 0 hr | 103 ± 2 | 101 ± 3 | 92 ± 4 | 95 ± 2 |
| 0.25 hr | 176 ± 7 | 146 ± 5 | 147 ± 7 | 131 ± 5 |
| 0.5 hr | 187 ± 9 | 163 ± 7 | 164 ± 5 | 150 ± 3 |
| 1 hr | 188 ± 4 | 168 ± 6 | 169 ± 5 | 149 ± 5 |
| 2 hr | 103 ± 4 | 113 ± 5 | 136 ± 2 | 134 ± 4 |
| 4 hr | 84 ± 3 | 85 ± 2 | 80 ± 3 | 84 ± 3 |
| ΔAUC $_{0-1\ hr}$ (mg · hr/dL) | 174 ± 5 | 152 ± 5 | 152 ± 4 | 138 ± 3 |
| Plasma insulin (pg/ml) |  |  |  |  |
| 0 hr | 386 ± 42 | 380 ± 29 | 278 ± 25 | 277 ± 43 |
| 0.25 hr | 2091 ± 410 | 1219 ± 183 | 1197 ± 146 | 996 ± 204 |
| 0.5 hr | 1282 ± 269 | 978 ± 182 | 1014 ± 131 | 894 ± 121 |
| 1 hr | 1465 ± 247 | 1187 ± 152 | 933 ± 111 | 675 ± 140 |
| 2 hr | 322 ± 37 | 425 ± 40 | 551 ± 98 | 488 ± 68 |
| 4 hr | 324 ± 36 | 338 ± 92 | 286 ± 39 | 285 ± 34 |
| ΔAUC 0-1 hr (pg · hr/dL) | 1418 ± 236 | 1016 ± 148 | 948 ± 88 | 788 ± 129 |

Figure 1B:
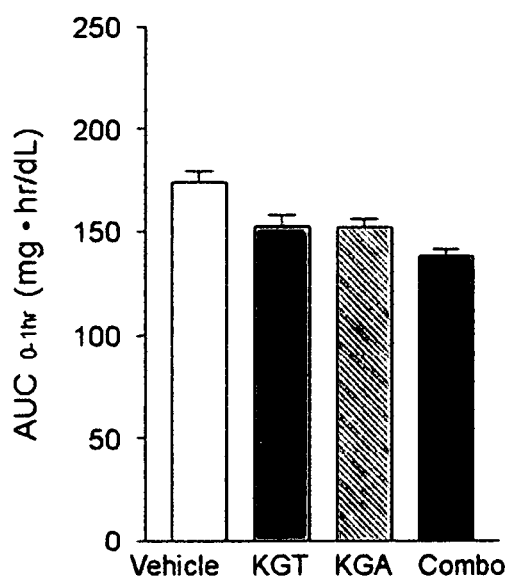
FIG. 1B is a graph showing the $AUC_{0-1\ hr}$ (mg·hr/dL) of the OGTT of FIG. 1A.
Figure 2A:
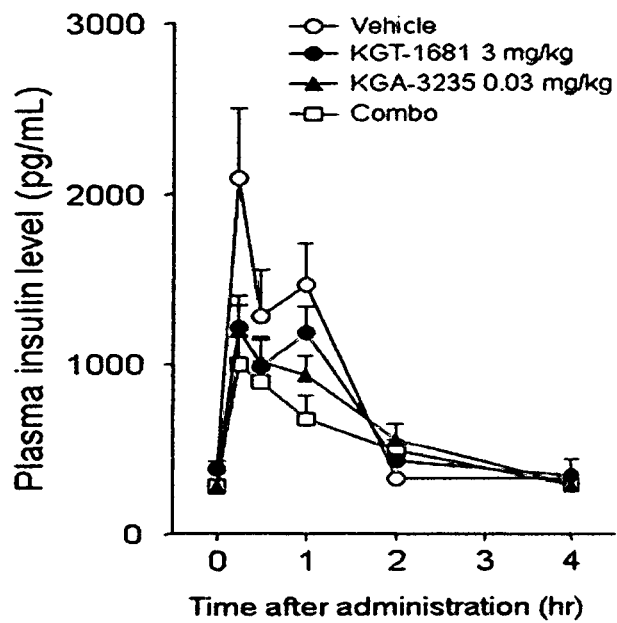
FIG. 2A is a graph showing the effects of Remogliflozin etabonate (referred to as KGT-1681), Mizagliflozin (referred to as KGA-3235) and the combination of Remogliflozin etabonate and Mizagliflozin (Combo) on plasma levels of insulin (pg/mL) over a 4-hour post-administration period of time in an oral glucose tolerance test (OGTT) in normal rats.
Figure 2B:
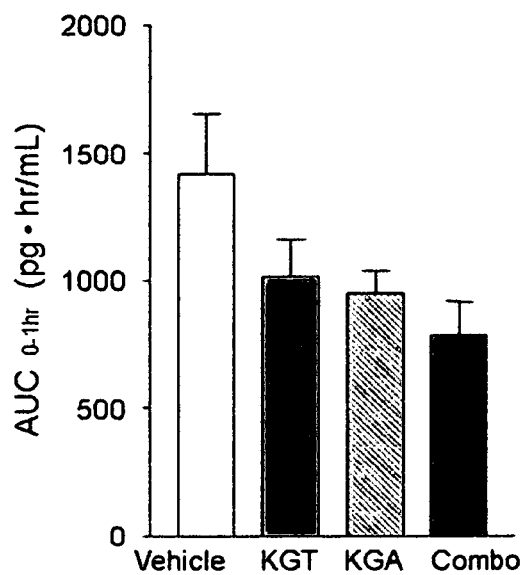
FIG. 2B is a graph showing the $AUC_{0-1\ hr}$ (pg·hr/dL) of the OGTT of FIG. 2A.

KGT-1681 and KGA-3235 inhibited the increase in plasm glucose after glucose loading. Furthermore, the plasma glucose level of combo was suppressed more potently in comparison with those obtained by either drug alone (FIG. 1A). The AUC0-1hr for plasma glucose were shown in FIG. 1B. Two-way ANOVA indicated a significant main effect on the KGT-1681 and KGA-3235 in AUC0-1hr for plasma glucose ($F(1, 20)=15.66$, $P=0.0008$ and $F(1, 20)=16.23$, $P=0.0007$, respectively). The plasma insulin was decreased by KGT-1681 and KGA-3235 (FIG. 2A), corresponding to the reduction in the plasma glucose level. The AUC0-1 hr for plasma insulin were shown in FIG. 2.

REFERENCES

Matthias Hepprich et al. *Cell Metabolism*, 31:1-11 (2020)
Hiromasa Ishii, et al. *Journal of Clinical and Experimental Medicine*, 206(5):323-325, (2003).
Naoki Tanaka et al. *Acta Hepatologica Japonica*, 43, No(12):539-549 (2002).
Kazuhiko Koike, et al. *Journal of Clinical and Experimental Medicine*, 206(5):385-388, (2003).
Koutaro Uchimura, et al. *The Japanese Journal of Clinical and Experimental Medicine*, 80(3)503-506, (2003).
Kenichiro Iwamura, *Kanzo Acta Hepatologica Japonica*, 12(12):659-669, (1971).
Moriya, R., et al., *Am J Physiol Endocrinol Metab*, 297: E1358-E1365 (2009).

What is claimed is:
1. An oral dosage form comprising:
A) a remogliflozin or pharmaceutically acceptable salt thereof; and

B) mizagliflozin or pharmaceutically acceptable salt thereof.

2. The oral dosage form of claim 1, wherein the oral dosage form comprises from 1 mg to 1000 mg of remogliflozin or pharmaceutically acceptable salt thereof and from 0.25 mg to 20 mg of mizagliflozin or pharmaceutically acceptable salt thereof.

3. The oral dosage form of claim 1, wherein the pharmaceutically acceptable salt of mizagliflozin is selected from the monosebacate and hemifumarate dehydrate salts.

4. A method of treating a metabolic disease, wherein the method comprises administering an oral dosage form of claim 1 to a subject in need thereof.

5. The method of claim 4, wherein the metabolic disease is a disease associated with abnormal accumulation of liver lipids, and/or a disease associated with hyperglycemia.

6. The method of claim 5, wherein the metabolic disease is diabetes mellitus, metabolic syndrome, dumping syndrome, post bariatric hypoglycemia, non-alcoholic steatohepatitis, and/or non-alcoholic fatty liver disease.

7. The method of claim 4, wherein the metabolic disease is selected from the group consisting of diabetes, elevated fasting blood glucose, insulin resistance, impaired glucose tolerance, primary biliary cholangitis, primary sclerosing cholangitis, gallbladder disease, dyslipidemia, gout, high cholesterol, high levels of triglycerides, high blood pressure, hypertension, coronary artery disease, heart disease, stroke, thrombotic stroke, deep vein thrombosis (DVT), metabolic disorders, hypoalphalipoproteinemia, familial combined hyperlipidemia, Syndrome X, and insulin-resistant Syndrome X.

8. The method of claim 4, wherein the oral dosage form comprises from 1 mg to 1000 mg of remogliflozin or pharmaceutically acceptable salt thereof and from 0.25 mg to 20 mg of mizagliflozin or pharmaceutically acceptable salt thereof.

9. The method of claim 4, wherein the pharmaceutically acceptable salt of mizagliflozin is selected from the monosebacate and hemifumarate dehydrate salts.

* * * * *